No. 811,932. PATENTED FEB. 6, 1906.
P. R. KRAMER & G. E. WILSON.
BAND CUTTER AND FEEDER.
APPLICATION FILED MAY 31, 1904.

WITNESSES
M. M. Ennis
M. Hagerty

INVENTORS
PETER R. KRAMER
GEORGE E. WILSON
BY Paul & Paul
THEIR ATTORNEYS

No. 811,932. PATENTED FEB. 6, 1906.
P. R. KRAMER & G. E. WILSON.
BAND CUTTER AND FEEDER.
APPLICATION FILED MAY 31, 1904.
7 SHEETS—SHEET 6.

WITNESSES

INVENTORS
PETER R. KRAMER
GEORGE E. WILSON
BY Paul &Paul
THEIR ATTORNEYS

UNITED STATES PATENT OFFICE.

PETER R. KRAMER AND GEORGE E. WILSON, OF STILLWATER, MINNESOTA.

BAND-CUTTER AND FEEDER.

No. 811,932.

Specification of Letters Patent.

Patented Feb. 6, 1906.

Application filed May 31, 1904. Serial No. 210,330.

*To all whom it may concern:*

Be it known that we, PETER R. KRAMER and GEORGE E. WILSON, of Stillwater, in the county of Washington, State of Minnesota, have invented certain new and useful Improvements in Band-Cutters and Feeders, of which the following is a specification.

This invention relates to improvements in band-cutters and feeders for threshing-machines; and the objects we have in view are to provide a band-cutter and feeder with three governors, the first starting the feeding mechanism when the threshing-cylinder has attained the desired speed, the second regulating the movement of the endless grain or bundle carrier and causing said carrier to be driven at a fast or slow speed, as may be required to handle the amount of grain that is in position to pass under the threshing-cylinder, and the third being arranged in connection with and governing the action of a retarding device placed near the cylinder, so as to control the grain as it passes to said cylinder.

Another object of the invention is to provide means for adjusting the cutters toward or from the bundle-carrier.

The invention consists generally in the constructions and combinations hereinafter described, and particularly pointed out in the claims.

In the accompanying drawings, forming part of this specification.

Figure 1:
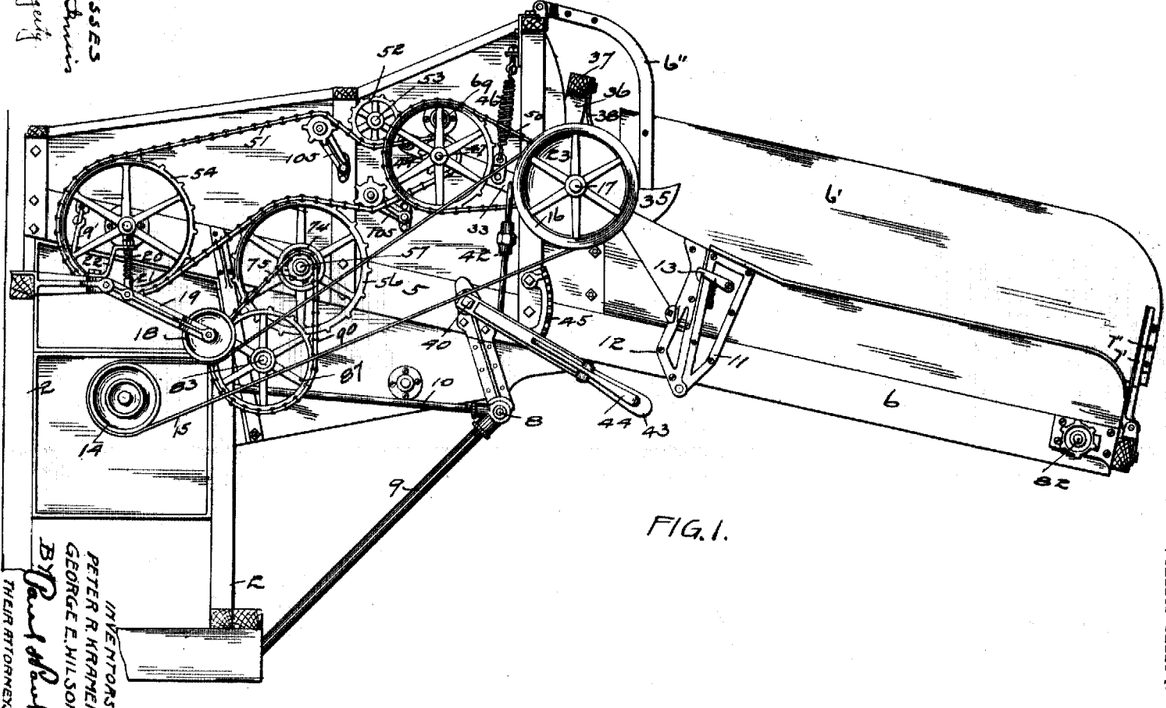
Figure 1 is a side elevation of a band-cutter and feeder embodying our invention.
Figure 4:
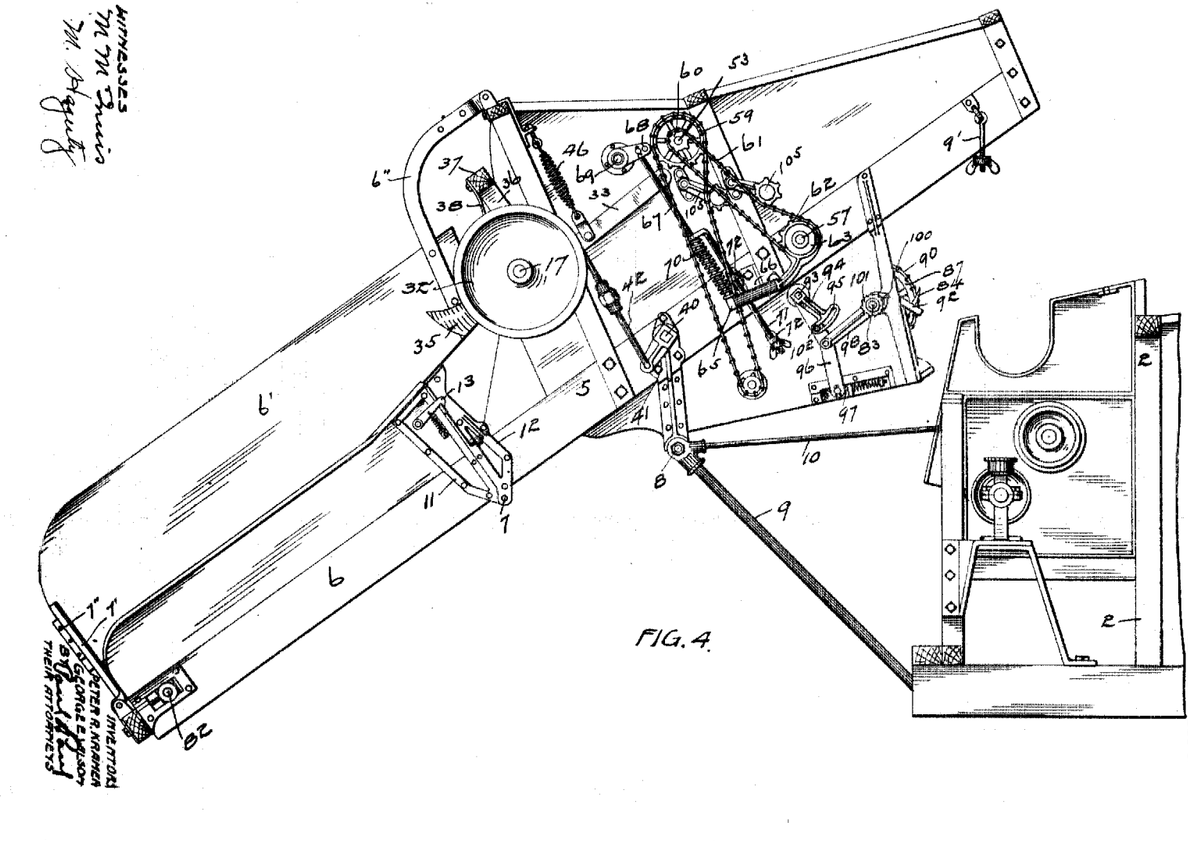
Fig. 4 is a side elevation showing the band-cutter and feeder elevated for the purpose of permitting access to the threshing-cylinder.

*General features.*—In all of the drawings, 2 represents a portion of the frame of a threshing-machine provided with the usual cylinder 3 and concave 4. The frame of the band-cutter and feeder consists of two parts 5 and 6, hinged together at 7 and pivotally supported as a whole at 8 upon the braces 9 and 10, secured to the frame of the threshing-machine. This construction permits the outer portion of the frame to be folded under the inner portion in a manner well understood in this class of machines and also permits the entire frame to be turned upon its pivot, so as to raise the inner end of the frame to the position shown in Fig. 4, thereby permitting access to the threshing-cylinder. When in position for use, the feeder-frame is locked to the frame of the threshing-machine by the bolts 9'. The frames 5 and 6 are provided upon each side where they come together with the metallic frames 11 and 12, (see Figs. 1 and 4,) and the parts of the frame are adapted to be locked in position by the spring-controlled latch 13.

Figures 5, 6, 7, 8:
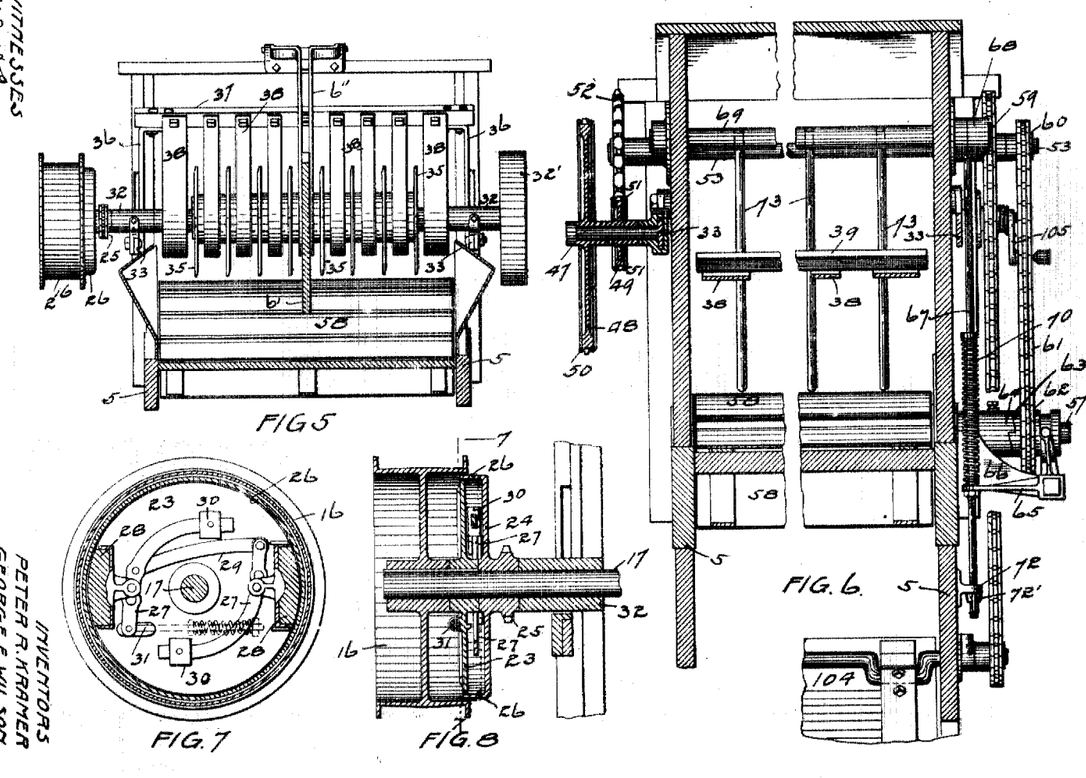
Fig. 5 is a transverse section through the bundle-carrier on line 5 5 of Fig. 2, showing the position of the knives in relation to said carrier.
Fig. 6 is a transverse section on line 6 6 of Fig. 2, partly broken away and showing the clutch mechanism in connection with the shaft for driving the carrier.
Figs. 7 and 8 are details of the governor for bringing the band-cutter and feeder into operation when the threshing-cylinder has attained the desired speed and maintaining it in operation while the cylinder has such speed, Fig. 7 being a section on the line 7 7 of Fig. 8.
Figure 9:
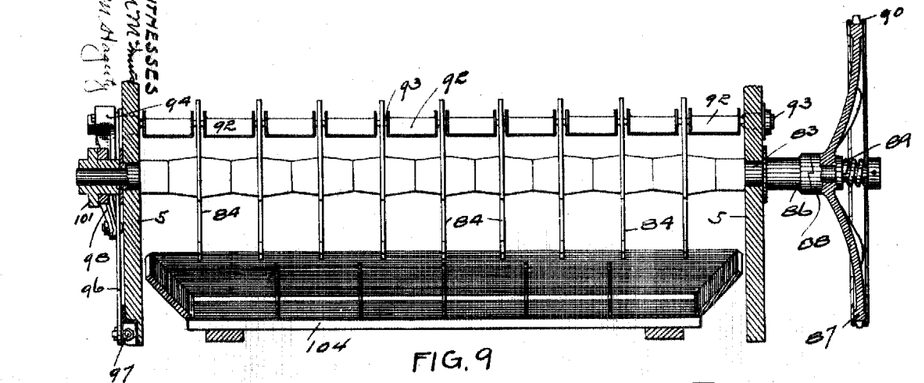
Fig. 9 is a transverse section on line 9 9 of Fig. 2, showing the grain-retarders and the depressible plates by which the retarding devices are thrown out of operation.

*The main governor.*—The shaft of the threshing-cylinder is provided with a pulley 14, and a belt 15 extends from this pulley around a pulley 16 upon a shaft 17, that carries the band-cutting knives. A belt-tightener pulley 18 is mounted in a pivoted arm 19 and bears upon the belt 15, being held against said belt with a yielding pressure by a spring 20, surrounding a rod 21, having one end pivotally connected to the arm 19 and its other end engaging a stationary lug or arm 22. The pulley 16 is fixed upon the shaft 17, preferably by means of a suitable key or spline, and a disk 23 is also fixed upon said shaft, so as to rotate therewith. Mounted loosely upon said shaft is a disk 24, provided upon its hub with a sprocket 25 and having also a rim or inturned flange 26. Pivoted arms 27 are secured upon the disk 23, and said arms have connected to them the friction-blocks 28, adapted to engage the inturned flange 26 upon the disk 24. The arms 27 are connected by the rod 29, and each of said arms is provided with an adjustable weight 30. One of the arms 27 is provided with a lug that extends through a slot in the disk 23 and is connected to a spring-controlled rod 31. This spring tends to hold the blocks 28 out of engagement with the flange 26 upon the disk 24. When the pulley 16 and disk 23 are rotated, the weights 30 tend to move outward under the influence of centrifugal force, and when a sufficient speed is attained the tension of the spring upon the rod 31 is overcome, and the blocks 28 are forced against the rim or inturned flange 26, causing the disk 24 to move with the pulley 16 and disk 23, and thereby to drive the mechanism that is connected to the sprocket 25. (See Figs. 7 and 8.)

Figure 2:
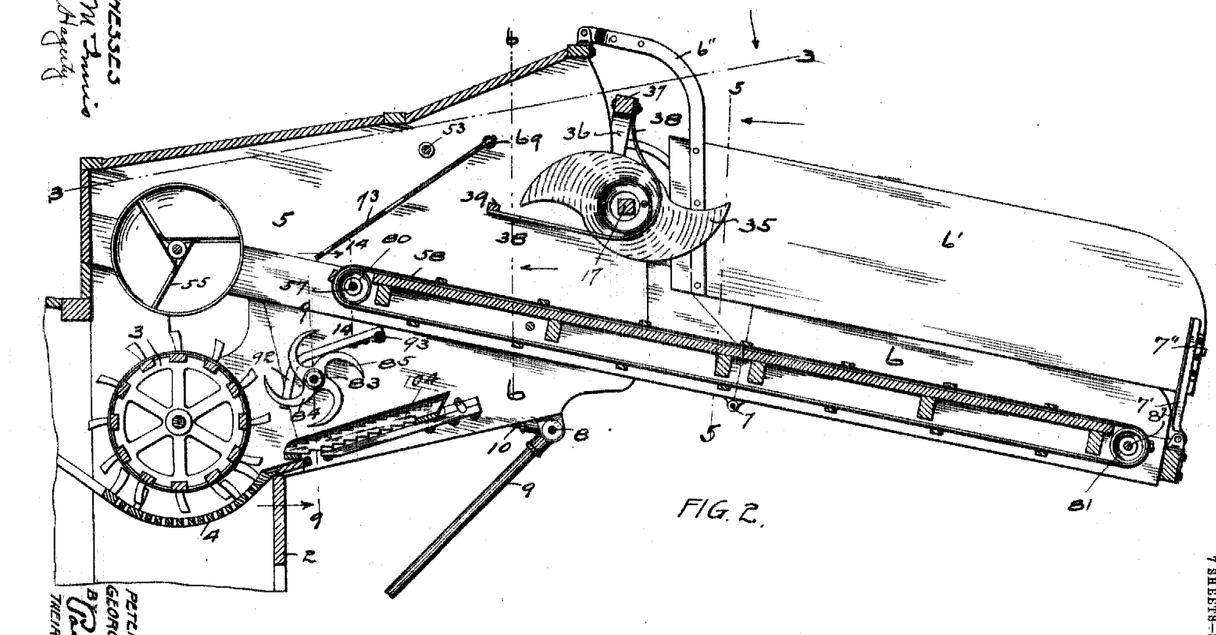
Fig. 2 is a longitudinal vertical section of the same.
Figure 3:
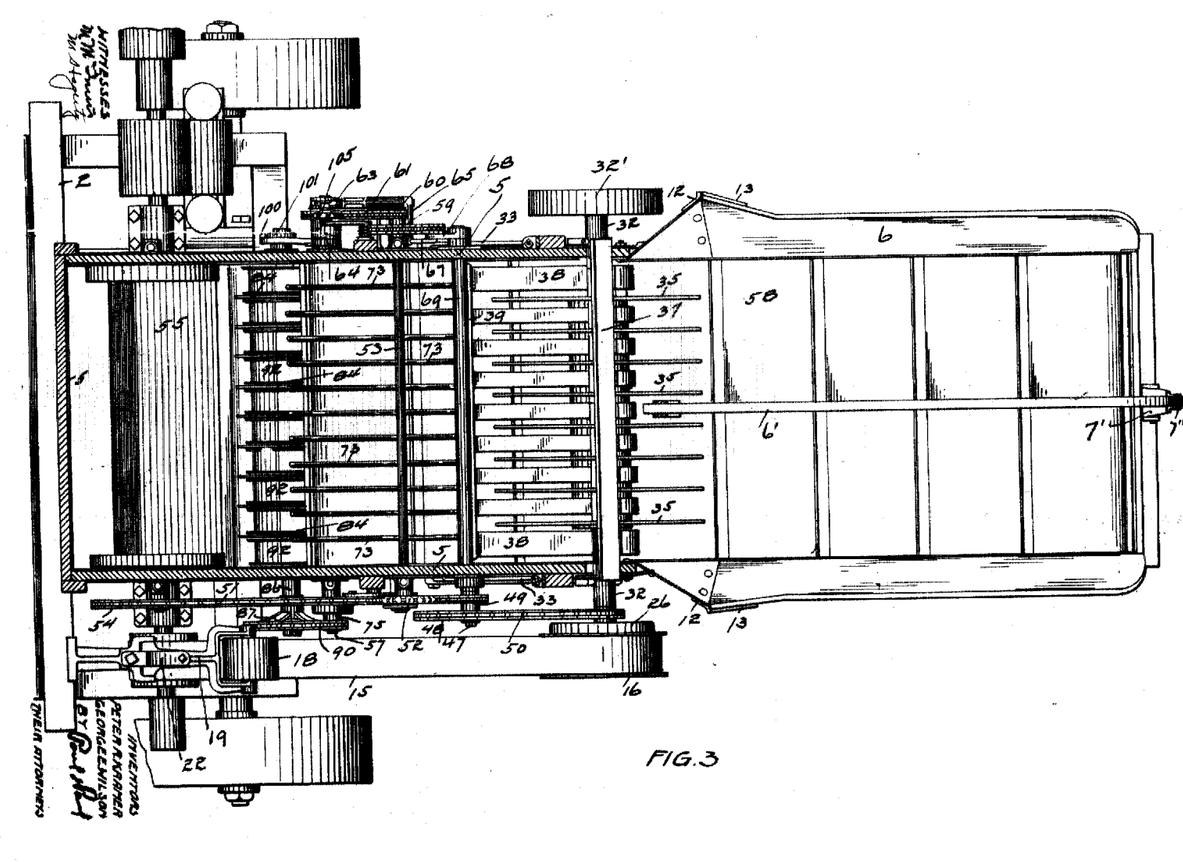
Fig. 3 is a plan section on line 3 3 of Fig. 2.
Figure 17:
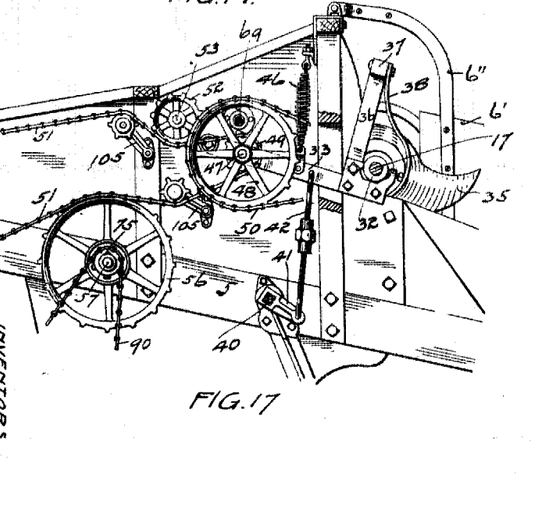
Fig. 17 is a partial side elevation similar to that shown in Fig. 1 with a part of the mechanism omitted.

*The knife-adjuster.*—The shaft 17 is mounted at each end in a sleeve 32, that is supported upon a pivoted lever 33. (See Fig. 17.) The opposite end of each lever 33 is pivoted upon the frame 5, so that the ends of the levers which carry the shaft 17 are capable of being raised or lowered, and thereby bringing said shaft 17 nearer to or farther from the bundle-carrier. The shaft 17 carries the knives 35, which may be of any usual or preferred construction. The levers 33 also carry the upright arms 36, that support the cross-bar 37 and the series of knife-guards 38, which extend around the hubs of the knives and are connected by the cross-bar 39. The guards 38 are preferably formed of spring metal and serve to keep the straw and unthreshed grain from winding around the hubs of the knives. (See Figs. 2 and 5.) For the purpose of adjusting said knives we prefer to provide a shaft 40, passing through the frame of the machine below the bundle-carrier and provided with the crank-arms 41. Rods 42 connect the crank-arms 41 with the levers 33. (See Fig. 17.) An adjusting hand-lever 43 is secured upon the end of the shaft 40, and this lever is provided with a catch 44, adapted to engage a segmental rack 45. (See Fig. 1.) By means of the lever 43 the levers 33 may be raised or lowered, and thereby the knives may be adjusted and brought nearer to or carried farther away from the bundle-carrier. Suitable springs 46 are also connected to the levers 33 and to the frame of the machine, and said springs tend to lift the levers 33 as soon as the catch 44 is released. From the sprocket 25 upon the hub of the governor-disk 24 all of the parts of the mechanism are driven. These parts consist of the endless carrier for moving the bundles forward to the band-cutter and to the threshing-cylinder, the grain-retarder by which the feeding of the grain to the cylinder is regulated, the vibrating pan by which the heads of the grain broken from the straw and other fine material are fed to the threshing-cylinder, and the rotating beater by which the grain as it leaves the endless carrier is moved downward to the threshing-cylinder.

Figure 16:
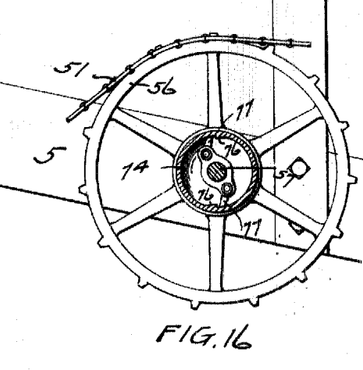

*Means for driving the bundle-carrier.*—As already stated, we provide means whereby the bundle-carrier may be driven at a fast or slow speed, determined by the amount of grain that has been carried forward and is in position to pass to the threshing-cylinder. One of the levers 33 carries a stud 47, upon which is mounted a sleeve having secured to it a sprocket-wheel 48 and a sprocket-wheel 49. (See Fig. 6.) A sprocket-chain 50 passes from the sprocket 25 on the shaft 17 around the sprocket-wheel 48 and drives said wheel and the sprocket 49. A chain 51 passes from the sprocket 49, engages first a sprocket 52 on a transverse shaft 53, then a sprocket-wheel 54 on the shaft of the revolving beater 55, and then a sprocket-wheel 56 on the shaft 57 of the bundle-carrier 58. The shaft 53 passes through the frame of the machine and is provided at its opposite end from that carrying the sprocket-wheel 52 with the sprockets 59 and 60. A chain 61 connects the sprocket 60 with a sprocket 62 on a clutch member 63 on the shaft 57. The clutch member 63 engages a second clutch member 64 on the shaft 57. A bell-crank lever 65 is mounted in a bracket 66, secured to the frame of the machine and having a forked end engaging the movable clutch member 63. A rod 67 is connected to the other end of the bell-crank lever and the opposite end of the rod is connected to a crank-arm 68 on a transverse shaft 69. A spring 70 surrounds the rod 67 and bears on one arm of the bell-crank lever 65 and tends to hold the two members of the clutch in engagement with each other. A rod 71, mounted in supports 72 on the side of the machine and provided with an adjusting-nut 72', has an inturned end through which the rod 67 passes and which bears upon the spring 70. By this means the tension of the spring may be adjusted. The shaft 69 carries a number of rods or fingers 73, (see Fig. 2,) which project over the bundle-carrier 58. Ordinarily the bundle-carrier will be driven at the normal speed through the chain 61 and the connected parts above described. Should, however, a larger amount of grain than can conveniently be taken care of by the cylinder be brought forward by the carrier, the rods or fingers 73 will be raised by the grain, the shaft 69 will be turned, and through the described connections the clutch will be disconnected. The carrier would not stop except for the connection with the opposite end of the shaft 57. This shaft has secured to it a flanged hub 74 and a sprocket 75. This hub is provided with the projections 76, and dogs 77, secured upon the wheel 56, are adapted to engage said projections. (See Fig. 16.) Ordinarily the shaft 57 turns faster than the wheel 56 and the dogs slip over the projections; but when the clutch at the opposite end of the shaft is disconnected the dogs are engaged by the projections and the shaft 57 is driven by the wheel 56 and at a slower speed than that at which it was formerly turned. The carrier will move at a slower speed as long as the accumulation of grain remains under the rods or fingers 73. As soon as this accumulation of grain is taken away by the cylinder the clutch will be automatically reëngaged and the carrier will again be driven at the higher speed.

The bundle-carrier 58 may be of any ordinary or preferred construction. As here shown, it consists of an endless belt or apron provided with the usual cross-bars or slats to move the bundles forward, causing them to pass below the knives where the cords are cut and delivering the loose grain to the threshing-cylinder. The shaft 57 is provided with suitable pulleys 80, which support the carrier at one end, and its other end is mounted upon similar pulleys 81 on the shaft 82.

Figure 10:
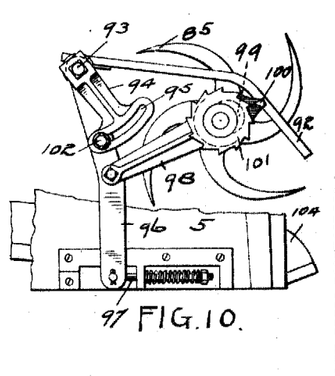
Figs. 10 and 11 are details of the retarding device and the means for controlling the same.
Figure 11:
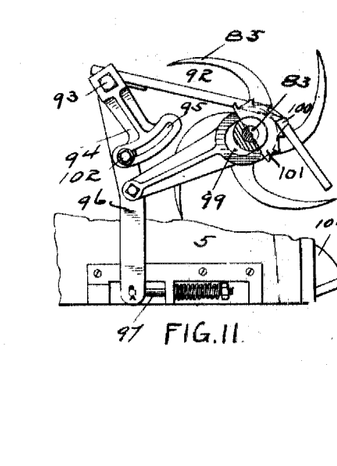
Figure 15:
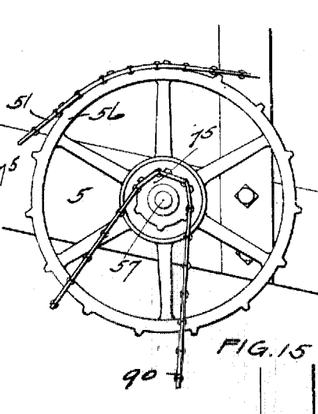
Figs. 15 and 16 are details of a portion of the mechanism for changing the speed of the carrier, Fig. 16 being a section on line 16 16 of Fig. 14.

*The grain-retarders.*—Mounted in the frame 5 in a position to come directly in front of the threshing-cylinder and in close proximity thereto is a shaft 83, carrying a series of wheels 84, each having a series of curved teeth 85, adapted to catch the grain and retard it or hold it back, so as to prevent its being drawn too rapidly between the threshing-cylinder and the concave. Our object in placing the retarders so that their teeth barely clear those of the cylinder is to prevent a sufficient quantity of grain passing down to the cylinder between it and the retarders to clog the cylinder, and the desired result we have found cannot be obtained except by placing the retarders close to the cylinder. The thresher-cylinder runs at a high speed and the retarders at a comparatively slow speed, and as their teeth are very near together it will be impossible for the grain to pass between them in bunches, but will be spread out and separated into a thin sheet, the teeth of the retarders engaging and holding back the grain while it is being combed out by the rapidly-revolving cylinder-teeth. Ordinarily these retarders are rotated slowly and cause the grain to be passed uniformly to the cylinder. Should, however, a mass of grain be brought forward and delivered by the carriers, the retarders stop and hold back the grain until a portion thereof has been removed by the cylinder. To secure this result, we provide means for driving the retarder-shaft and causing it to stop when too great an amount of grain has been delivered by the carrier. The shaft 83, which carries the retarders, is mounted in suitable bearings in the part 5 of the machine-frame. The shaft is provided near one end with one member 86 of a friction-clutch. A sprocket-wheel 87 is mounted loosely on this shaft, and its hub is provided with the other member 88 of the clutch. A spring 89 holds the two members of the clutch in contact, so that ordinarily the shaft is driven by the sprocket-wheel 87, which in turn is driven by a chain 90 from the sprocket 75 on the bundle-carrier shaft 57. (See Fig. 15.) Above the shaft 83 and between the retarders we arrange a series of pressure-plates 92, that are all secured to a transverse shaft 93, and said plates extend over the shaft 83 and preferably project downward toward the cylinder. (See Figs. 2, 10, and 11.) The shaft 93 carries at one end a crank-arm 94, having a curved slot 95. (See Figs. 10 and 11.) An arm 96 is pivoted on the shaft 93, and its opposite end is connected to a spring-controlled rod 97. (See Figs. 10 and 11.) An arm 98 is pivoted to the arm 96, its free end being provided with a slot 99, through which the shaft 83 passes, and with a stop-lug 100, adapted to engage the teeth of a ratchet-wheel 101 on the shaft 83. The arms 94 and 96 are adjustably secured together by a bolt 102, which passes through the slot 95 in the arm 94. Ordinarily the plates 92 stand in the position shown in Fig. 10 with the lug 100 clear of the ratchet-wheel, and the shaft 83 is free to rotate with the sprocket-wheel 87. Should, however, a mass of grain be brought forward by the carrier and fall on the retarders and exert considerable pressure on one or more of the plates 92, the lug 100 will be brought into engagement with the ratchet-wheel and the shaft 83 and the retarders will be held stationary, the wheel 87 being permitted to turn on the shaft by one member of the friction-clutch slipping on the other. As soon as the pressure on the plates 92 is relieved the spring-controlled rod 97 moves the arm 96, the lug 100 is disengaged from the ratchet-wheel, and the shaft 83 and the retarders are rotated by the sprocket-wheel 87. The action of stopping the retarders is repeated as often as sufficient grain accumulates above the retarders to exert considerable pressure on the plates 92.

Figure 12:
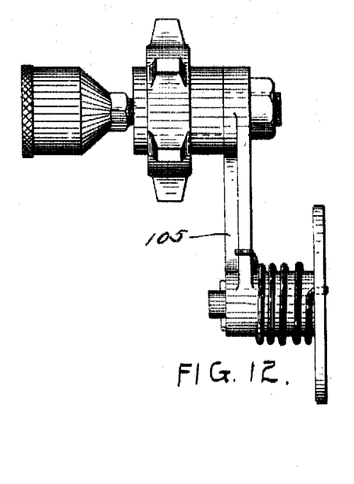
Figs. 12 and 13 are details of the sprocket-chain tighteners.
Figure 13:
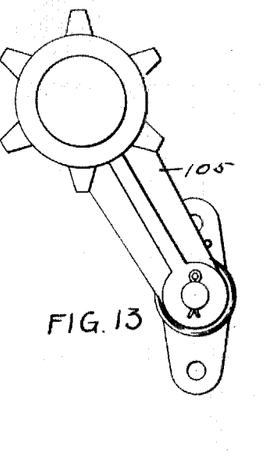
Figure 14:
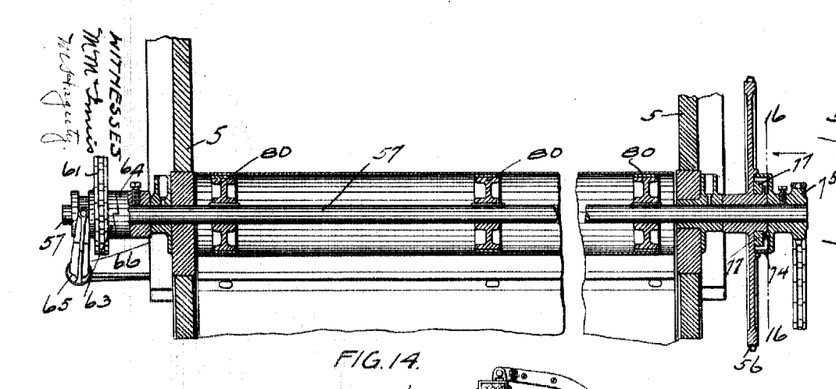
Fig. 14 is a transverse section on line 14 14 of Fig. 2 through the shaft, by which the carrier is operated.

The machine is preferably provided with a rotating beater 55 of ordinary or preferred construction arranged above the threshing-cylinder (see Fig. 2) and with a vibrating pan or carrier 104 arranged below the end of the endless carrier and below the retarders. (See Fig. 2.) Spring-controlled tighteners 105 are preferably provided for the several sprocket-chains. These tighteners are shown in detail in Figs. 12 and 13.

A fly-wheel 32' is preferably provided on the end of the shaft 32 opposite the pulley 16. A division-board 6' is arranged above the bundle-carrier extending lengthwise thereof above its middle portion and secured at its inner end to a forked arm 6″, that is pivoted on the feeder-casing. The outer end of the board 6′ is straddled by a fork 7′, pivoted at its lower end on the bundle-carrier frame and held in place with respect to the board by a suitable stop 7″. When the board is raised and turned back over the feeder-casing, the fork 7′ will swing down below the carrier out of the path of the grain.

We do not limit ourselves to the details of the construction herein shown and described, as the same may be varied in many particulars without departing from our invention. With our band-cutter and feeder the bundles are moved forward, the bands are cut, and the grain is delivered evenly and regularly to the threshing-cylinder, which insures perfect threshing.

We claim as our invention—

1. In a band-cutter and feeder, the combination, with a casing, of a bundle-carrier, a shaft 83 provided near the discharge end of said carrier, a series of curved arms mounted on said shaft, a driven sprocket-wheel, a clutch mechanism connecting said wheel and said shaft, pressure-plates arranged to overhang said shaft between said arms, and mechanism including a spring-pressed adjustable arm connecting said pressure-plates with said clutch device, whereby when the accumulation of grain on said plates exceeds a certain amount said clutch will be operated to stop said shaft and retarding-arms, substantially as described.

2. In a band-cutter and feeder, the combination, with a casing, of a shaft 83 mounted therein, retarding-arms carried by said shaft, a clutch connected with said shaft, a series of pressure-plates arranged to extend between said retarding-arms, a shaft 93 whereon said plates are mounted, a crank-arm 94 secured on said shaft 93, an arm 96 pivoted on said shaft 93 and having an adjustable connection with said arm 94, a spring-pressed rod connected with said arm 96, and an arm 98 connecting said arm 96 and said clutch and arranged to operate the same to stop said retarding device when the weight of the grain on said plates exceeds a predetermined amount.

3. In a band-cutter and feeder, the combination, with a casing, of a bundle-carrier, a shaft 17 provided above the same, a series of band-cutting knives carried by said shaft, a pulley 16 and a disk 23 secured on said shaft, a disk 24 loosely mounted on said shaft and having an inwardly-turned flange 26, arms 27 pivoted on said disk 23 and carrying friction-blocks 28, weights 30 carried by said arms, a rod 29 connecting one arm on one side of its pivot with the other arm on the opposite side of its pivot, a spring connected with one of said arms and arranged to oscillate them and withdraw said blocks from contact with said flange, but allowing them to be thrown outward by centrifugal force to engage said flange, substantially as described.

4. The combination, with a carrier and its shaft, of a rock-shaft having a series of arms overhanging said carrier, a driving mechanism connected with said carrier-shaft, operative connections provided between said rock-shaft and said driving mechanism for disconnecting the latter when said arms are raised by the pressure of the grain, and a continuously-operating mechanism in constant engagement with said carrier-shaft for operating the same at a slower speed after the disconnection of said driving mechanism.

5. The combination, in a band-cutter and feeder, with a bundle-carrier and its shaft 57, of a rock-shaft 69 arranged above said carrier and having a series of arms overhanging the same, a clutch mechanism provided on said shaft 57, operative connections provided between said clutch mechanism and said shaft 69, a driven sprocket-wheel 56 loosely mounted on said shaft 57, and means for driving said shaft 57 from said wheel when said clutch mechanism is disconnected by the movement of said rock-shaft.

6. In a band-cutter and feeder, the combination, with a casing, of a carrier having a shaft 57, a rock-shaft 69 provided above said carrier, and having a series of arms 73 arranged to overhang the same, a clutch mechanism provided on said shaft 57 and operatively connected with said shaft 69 and arranged to be alternately set and released by the rocking of said shaft 69, a flanged hub 74 and a sprocket 75 secured on said shaft 57, said hub having projections 76, a sprocket-wheel 56 loosely mounted on said shaft 57, dogs 77 secured on said wheel and adapted to engage said projections, and means for driving said sprocket 56.

7. In a band-cutter and feeder, the combination, with a casing, of a bundle-carrier and its shaft, and means for driving the same, a rock-shaft 69 arranged above said carrier and provided with a series of arms overhanging said carrier, a clutch mounted on said bundle-carrier shaft and comprising a fixed and a movable driven member, a bell-crank lever 65 arranged to engage the movable member of said clutch, a rod 67 having one end connected to said bell-crank, a crank-arm 68 mounted on said shaft 69 and connected to the other end of said rod, and a spring 70 provided on said rod 67 and normally under compression to hold the members of said clutch in their locked position, substantially as described.

8. The combination, with a carrier and its shaft and a driving mechanism connected therewith, of means operated by the pressure of the grain for temporarily disconnecting said driving mechanism from said shaft, and a continuously-operating mechanism in constant engagement with said shaft for operating the same at a slower speed after the disconnection of said driving mechanism.

9. The combination, with a carrier and its shaft and a driving mechanism connected therewith, of means arranged to be operated by the pressure of grain for disconnecting said driving mechanism from said shaft when an overplus of grain accumulates on said carrier, and a continuously-operating mechanism in engagement with said shaft and normally idle by reason of the greater speed of the shaft but becoming operative to drive said shaft when it is disconnected from said driving mechanism.

10. The combination, with a carrier and its shaft and a driving mechanism connected therewith, of means operated by the pressure of the grain for disconnecting said driving mechanism and releasing said shaft, a continuously-operating sprocket-wheel and a ratchet mechanism interposed between said wheel and shaft and normally idle but arranged to engage and drive said shaft when it is disconnected from said driving mechanism.

11. The combination, with a carrier and its shaft and driving mechanism connected therewith, of means operated by the pressure of the grain for disconnecting said driving mechanism from said shaft, a continuously-operating sprocket-wheel loosely mounted on said shaft, and dogs carried by said wheel and arranged to engage projections on said shaft and drive the same when it is disconnected from said driving mechanism.

In witness whereof we have hereunto set our hands this 23d day of May, 1904.
PETER R. KRAMER.
GEORGE E. WILSON.
In presence of—
S. BLAIR McBERTH,
L. JOS. FAZENDIN.